Patented Sept. 3, 1929.

1,727,076

UNITED STATES PATENT OFFICE.

MICHAEL MELAMID, OF BERLIN-ZEHLENDORF, GERMANY.

PROCESS OF OBTAINING ALDEHYDE CONDENSATION PRODUCTS.

No Drawing. Application filed December 8, 1924, Serial No. 754,694, and in Germany December 4, 1923.

This invention has reference to a process of manufacturing condensation products of formaldehyde with hydroxy-aromatic hydrocarbons, such as phenols, kresols, naphthols and the like with aldehydes and in particular of formaldehyde and acetaldehyde or with substances splitting off aldehydes, and it is intended to facilitate the process of manufacture and to increase the number of substances obtainable by such condensation. The condensation products with formaldehyde heretofore known have always been manufactured by employing formalin of a concentration of 30 or 40%. By this manner of treatment a mixture of products is usually obtained which is only with difficulty converted into a product of higher melting point and of soluble condition. Formaldehyde resins in particular become almost insoluble upon being remelted but once. According to my invention it has been ascertained that this inconvenience may be overcome by taking care that the aldehyde is caused to react in the presence of a dilute electrolyte, either a dilute acid or a dilute alkali, preferably a dilute caustic alkali, this dilute electrolyte being added separately to one of the reacting bodies, before the reaction is allowed to proceed, so that a slight chemical change of the respective reacting body may be brought about, by the diluent, before the reaction is effected. It is quite probable that by this means on the one hand the formation of a phenolate or respectively of a phenol-ester and on the other hand a polymerization of the aldehyde or the formation of the corresponding aliphatic acid or haloid are induced in view of the fact that dilute alkalis and acids are well-known not to resinify, but to decompose aliphatic aldehydes in this manner. By the bringing about of such change the reactivity of the reagents is greatly increased, and a soluble product is obtained as contradistinguished from previous suggestions, where an insoluble resin was obtained by causing phenol, dilute alkali and formaldehyde to react simultaneously upon each other.

The dilution may also be effected with water, and then a suitable quantity of acid or alkalis is added. The dilute aldehyde solution may be added all at once or in subsequent portions.

*Example of the method of carrying out the invention.*

100 grammes phenol are heated on the water bath to about 40 degrees C. and then a mixture of 60 grammes formaldehyde of 30%, and 300 to 400 grammes 10% sulphuric acid are added. The reaction is finished in about two hours. After the excess of phenol and the water have been driven off, a resin is obtained with a melting point of about 90° C. This product is not changed upon being remelted and does not become insoluble.

The process is susceptible of general application. It may, for instance, also be employed under conditions in which aldehydes or acetaldehyde are not present originally, but are formed during the process.

A condensation product of phenol and aldehyde is obtained in this manner with almost quantitative yield and which is very well adapted for further treatment in accordance with the previous process.

The invention has been set forth in its broad aspects only, and it is to be understood that it is susceptible of modifications and changes within the scope of the claims herewith appended.

I claim:

1. The process of condensing hydroxy-aromatic hydrocarbons which consists in first diluting aldehyde with an electrolyte in excess and then treating the hydroxy-aromatic hydro-carbons with the mixture of aldehyde and electrolyte.

2. The process of condensing hydroxy-aromatic hydro-carbons, which consists in first diluting aldehyde with an acid in excess and then treating the hydroxy-aromatic hydrocarbons with the mixture of aldehyde and acid.

3. The process of condensing hydroxy-aromatic hydro-carbons, which consists in first diluting aldehyde with sulphuric acid in excess and then treating the hydroxy-aromatic hydro-carbons with the mixture of aldehyde and sulphuric acid.

M. MELAMID.